(12) United States Patent
Grabarnik et al.

(10) Patent No.: US 8,141,085 B2
(45) Date of Patent: Mar. 20, 2012

(54) APPARATUS AND DATA STRUCTURE FOR AUTOMATIC WORKFLOW COMPOSITION

(75) Inventors: Genady Ya. Grabarnik, Scarsdale, NY (US); Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/114,162

(22) Filed: May 2, 2008

(65) Prior Publication Data

US 2008/0235692 A1  Sep. 25, 2008

Related U.S. Application Data

(63) Continuation of application No. 11/406,002, filed on Apr. 18, 2006.

(51) Int. Cl.
*G06F 9/46* (2006.01)
*G06F 17/00* (2006.01)
*G06F 9/44* (2006.01)

(52) U.S. Cl. ............ 718/102; 718/106; 706/45; 706/46; 706/47; 717/100; 717/104

(58) Field of Classification Search .................. 718/102, 718/106; 706/45–61; 717/100, 104
See application file for complete search history.

(56) References Cited

U.S. PATENT DOCUMENTS

2005/0125738 A1  6/2005  Srivastava et al.
2007/0204020 A1  8/2007  Anderson et al.

OTHER PUBLICATIONS

Younes et al., "PPDDL1.0: An Extension to PDDL for Expressing Planning Domains with Probabilistic Effects", School of Computer Science Carnegie Mellon University, pp. 1-23. Oct. 2004.*
"Twentieth National Conference on Artificial Intelligence", Jul. 9-13, 2005, American Association for Artificial Intelligence, p. 1.*
Ghallab et al., "PDDL. The planning Domain Definition Language", Yale Center for Computational Vision and Control, 1998, DCS TR-1165.
Fox et al., "PFFL2.1: An Extension to PDDL for Expressing Temporal Planning Domains", Artificial Intelligence Research, 2003, vol. 20, pp. 61-124.
Riabov et al., "Planning for Stream Processing Systems", May 10, 2005, American Association for Artificial Intelligence, pp. 1205-1210.
Doshi et al., "Dynamic Workflow Composition using Markov Decision Processes", Jul. 2004, IEEE, pp. 576-582.

* cited by examiner

*Primary Examiner* — Qing Wu
(74) *Attorney, Agent, or Firm* — Yee & Associates, P.C.; William Stock

(57) ABSTRACT

A stream processing system provides a description language for stream processing workflow composition. A domain definition data structure in the description language defines all stream processing components available to the stream processing system. Responsive to receiving a stream processing request, a planner translates the stream processing request into a problem definition. The problem definition defines stream properties that must be satisfied by property values associated with one or more output streams. The planner generates a workflow that satisfies the problem definition given the domain definition data structure.

24 Claims, 10 Drawing Sheets

(define (domain DomainName)
    requirements
    types
    predicates
    actions
)

(:requirements :typing :sppl)

(:types typename . . .)

(:action action-name
    singleton-definition
    parameters
    cost-vector
    preconditions
    effects
)

(define (problem problem-name)
    domain-reference
    input-streams
    output-streams
    resource-constraints
    optimization-objective
)

(:domain domain_name)

FIG. 7A
```
(define (domain Test)
(:predicates :andlogic
    (S_noCA)
)
(:predicates :clearlogic
      (primal)
      (T_TG)
      (T_outN1p0)
      (T_outN2p1)
      (T_outN3p0)
      (T_outN4p0)
      (T_outN5p0)
      (T_outN6p0)
      (T_outN7p0)
      (T_outN8p0)
)
    (:action SourceN1
     :singleton
     :cost(-911.9375491384666 0.0)
     :precondition [primal] (and (primal))
     :effect [out0] (and
        (T_outN1p0)
        (S_noCA)
     )
    (:action SourceN2
     :singleton
     :cost(-643.3774686116677 0.0)
     :precondition [primal] (and (primal))
     :effect [out0] (and
        (T_outN2p1)
        (S_noCA)
     )
     (:effect [out1] (and
        (T_outN2p1)
        (S_noCA)
     )
    )
    (:action SourceN3
     :singleton
     :cost(-572.8417043308451 0.0)
     :precondition [primal] (and (primal))
     :effect [out0] (and
        (T_outN3p0)
        (S_noCA)
     )
. . .
```

FIG. 7B

```
(:action SourceN5
 :singleton
 :cost(-1071.341427372631 0.0)
 :precondition [primal] (and (primal))
 :effect [out0] (and
    (T_outN5p0)
    (S_noCA)
 )
)
(:action SourceN8
 :singleton
 :cost(-1176.9215595488222 0.0)
 :precondition [primal] (and (primal))
 :effect [out0] (and
    (T_outN8p0)
    (S_noCA)
 )
)
(:action N4A0
 :cost(-127.22164445252952 106.89516760862189)
 :precondition [in0] (and
    (T_outN2p0)
 )
 :effect [out0] (and
    (T_outN4p0)
 )
)
(:action N4A1
 :cost(-92.58138300153307 72.99993045734269)
 :precondition [in0] (and
    (T_outN2p0)
 )
 :effect [out0] (and
    (T_outN4p0)
 )
)
(:action N6A0
 :cost(-96.275866991582913 108.7748388328559)
 :precondition [in0] (and
    (T_outN4p0)
 )
 :effect [out0] (and
    (T_outN6p0)
 )
)

```
(:action N6A1
 :cost(-116.35941048443317 116.83818175035788)
 :precondition [in0] (and
   (T_outN4p0)
 )
 :effect [out0] (and
   (T_outN6p0)
 )
)
(:action N7A0
 :cost(-66.59908339592955 119.65397637309869)
 :precondition [in0] (and
   (T_outN2p1)
 )
 :effect [out0] (and
   (T_outN7p0)
 )
)
(:action N7A1
 :cost(-88.49645386128195 114.04062502961684)
 :precondition [in0] (and
   (T_outN2p1)
 )
 :effect [out0] (and
   (T_outN7p0)
 )
)
(:action N9A0
 :cost(-101.7907613796477 111.88091330724703)
 :precondition [in0] (and
   (T_outN2p1)
 )
 :precondition [in1] (and
   (T_outN3p0)
 )
 :precondition [in2] (and
   (T_outN5p0)
 )
 :precondition [in3] (and
   (T_outN6p0)
 )
 :precondition [in4] (and
   (T_outN7p0)
 )
 :precondition [in5] (and
   (T_outN8p0)
 )
 :effect [out0] (and
   (T_TG)
 )
)
)
. . .
```

FIG. 7D
```
(:action N9A1
  :cost(-103.83805053751249 101.46073968304557)
  :precondition [in0] (and
    (T_outN1p0)
  )
  :precondition [in1] (and
    (T_outN3p0)
  )
  :precondition [in2] (and
    (T_outN5p0)
  )
  :precondition [in3] (and
    (T_outN6p0)
  )
  :precondition [in4] (and
    (T_outN7p0)
  )
  :precondition [in5] (and
    (T_outN8p0)
  )
  :effect [out0] (and
    (T_TG)
  )
)
```

FIG. 8
```
(define (problem TestProblem)
    (:domain Test)
    (:objective 1 0)
    (:bound 1 439.23471407164214)
(:init (primal))
    (:goal (and
        (T_TG)
        (S_noCA)
      )
    )
)
```

```
<planset>
<plangraph
       problem="TestProblem"
       objective="-4792.25"
       cost="-4792.25,431.171">
   <node id="0" name="SourceN8">
      <port name="out0">
         <a name="S_noCA"/>
         <a name="T_outN8p0"/>
      </port>
   </node>
   <node id="1" name="N7A1">
      <port name="out0">
         <a name="S_noCA"/>
         <a name="T_outN7p0"/>
      </port>
   </node>
   <node id="2" name="SourceN2">
      <port name="out1">
         <a name="S_noCA"/>
         <a name="T_outN2p1"/>
      </port>
   </node>
   <node id="3" name="N4A0">
      <port name="out0">
         <a name="S_noCA"/>
         <a name="T_outN4p0"/>
      </port>
   </node>
   <node id="4" name="N6A0">
      <port name="out0">
         <a name="S_noCA"/>
         <a name="T_outN6p0"/>
      </port>
   </node>
   <node id="5" name="SourceN5">
      <port name="out0">
         <a name="S_noCA"/>
         <a name="T_outN5p0"/>
      </port>
   </node>
   <node id="6" name="SourceN3">
      <port name="out0">
         <a name="S_noCA"/>
         <a name="T_outN3p0"/>
      </port>
   </node>
```

*FIG. 9A*

FIG. 9B
```
<node id="7" name="SourceN1">
    <port name="out0">
      <a name="S_noCA"/>
      <a name="T_outN1p0"/>
    </port>
</node>
<node id="8" name="N9A1">
    <port name="out0">
       <a name="S_noCA"/>
       <a name="T_TG"/>
    </port>
</node>
<link fromNode="-1" fromPort="_init" toNode="0" toPort="primal"/>
<link fromNode="0" fromPort="out0" toNode="8" toPort="in5"/>
<link fromNode="2" fromPort="out1" toNode="1" toPort="in0"/>
<link fromNode="1" fromPort="out0" toNode="8" toPort="in4"/>
<link fromNode="-1" fromPort="_init" toNode="2" toPort="primal"/>
<link fromNode="2" fromPort="out0" toNode="3" toPort="in0"/>
<link fromNode="3" fromPort="out0" toNode="4" toPort="in0"/>
<link fromNode="4" fromPort="out0" toNode="8" toPort="in3"/>
<link fromNode="-1" fromPort="_init" toNode="5" toPort="primal"/>
<link fromNode="5" fromPort="out0" toNode="8" toPort="in2"/>
<link fromNode="-1" fromPort="_init" toNode="6" toPort="primal"/>
<link fromNode="6" fromPort="out0" toNode="8" toPort="in1"/>
<link fromNode="-1" fromPort="_init" toNode="7" toPort="primal"/>
<link fromNode="7" fromPort="out0" toNode="8" toPort="in0"/>
<link fromNode="8" fromPort="out0" toNode="-2" toPort="_goal"/>
</plangraph>
</planset>
```

US 8,141,085 B2

APPARATUS AND DATA STRUCTURE FOR AUTOMATIC WORKFLOW COMPOSITION

This application is a continuation of application Ser No. 11/406,002, filed Apr. 18, 2006, status pending.

This invention was made with Government support under Contract No.: TIA H98230-04-3-0001 awarded by U.S. Department of Defense. The Government has certain rights in this invention.

BACKGROUND OF THE INVENTION

1. Field of the Invention

The present invention relates generally to stream processing and, in particular, to workflow composition. Still more particularly, the present invention provides a method, apparatus, and program product for stream processing workflow composition using automatic planning.

2. Description of the Related Art

Stream processing computing applications are applications in which the volume of data being processed is too large to be stored and, therefore, the information must be processed on the fly. Examples of stream processing computing applications include video processing, audio processing, streaming databases, and sensor networks. Recent advances in software development technologies, together with the growing availability of powerful computers and high-bandwidth communications have brought to practice large compositional computing architectures.

This approach enables increased code reuse, simplified development, and high flexibility of the system. Components may be interconnected in multiple configurations, achieving highly complex functionality via composition of simpler black-box operations. Such architectures are being currently developed in many application areas, in particular, stream processing applications.

In compositional stream processing architectures, the stream processing applications are composed of several processing units or components. The processing units can receive information streams on one or more input ports and produce one or more output streams, which are sent out via output ports. The output streams are a result of processing the information arriving via the input streams, by filtering, annotating, or otherwise analyzing and transforming the information. Once an output stream is created, any number of other components can read data from it. All processing units together compose a workflow. A stream processing application reads and analyzes primal streams coming into the system and produces a number of output streams that carry the results of the analysis.

Composing stream processing workflows is a labor-intensive task, which requires that the person building the workflow has an extensive knowledge of component functionality and compatibility. In many cases, this makes it necessary for end-users of stream processing applications to contact application developers each time a new output information stream is requested and, as a result, a new workflow is needed. This process is costly, error-prone, and time-consuming. Also, changes to other elements of the stream processing system may require changes to the workflow. For example, processing units or primal streams may become unavailable, users may place certain restrictions on the output, or changes may be made to the components themselves.

In large practical stream processing systems, both changes in the data coming into the system and changes in the system configuration can invalidate deployed and running stream processing applications. With time, these applications can start to produce output that no longer satisfies the user's requirements or they can be relying on primal streams that have become inactive. In many situations, user's requirements can be better satisfied if an existing workflow is updated with newly available primal streams or processing units. Therefore, when changes such as those described above occur, the workflow must be reconfigured quickly, before any potentially valuable streaming data is lost. Such timely reconfiguration is extremely difficult to achieve if the workflow composition requires human involvement.

SUMMARY OF THE INVENTION

The present invention recognizes the disadvantages of the prior art and provides a computer implemented method for automatic workflow composition in a stream processing system.

In one illustrative embodiment, the computer implemented method comprises providing a description language for stream processing workflow composition. The method provides a domain definition data structure in the description language. The domain definition data structure defines all stream processing components available to the stream processing system. Responsive to receiving a stream processing request, the method translates the stream processing request into a problem definition. The problem definition defines stream properties that must be satisfied by property values associated with one or more output streams. The computer implemented method generates a workflow that satisfies the problem definition given the domain definition data structure.

In another exemplary embodiment, one or more stream properties data structures in the description language define primal streams available to the stream processing system. Each stream properties data structure is initialized with one or more property values for each primal stream.

In yet another exemplary embodiment, the domain definition data structure comprises a plurality of stream processing component data structures in the description language. Each stream processing component data structure describes one or more input ports and one or more output ports.

In another illustrative embodiment, a given stream processing component data structure within the plurality of stream processing component data structures defines a plurality of output ports.

According to one exemplary embodiment, each input port of each stream processing component is modeled using one or more preconditions on an action associated with the stream processing component. In another exemplary embodiment, each output port of each stream processing component data structure is modeled using effects of the action associated with the stream processing component.

In another illustrative embodiment, a given stream processing component in the workflow receives a first primal stream at a first input port. The one or more property values for the first primal stream satisfy the one or more preconditions of the first input port.

In yet another illustrative embodiment, a first stream processing component in the workflow generates an output stream at a first output port. A second stream processing component receives the output stream at a first input port. The one or more property values for the output stream satisfy the one or more preconditions of the first input.

According to an illustrative embodiment, a given stream processing component in the workflow generates an output stream at a first output port. The one or more property values for the output stream satisfy the problem definition.

In yet another illustrative embodiment, each primal stream available to the stream processing system and each output stream generated by a stream processing component is represented by a set of predicates.

In one illustrative embodiment, an apparatus for automatic workflow composition in a stream processing system is provided. The apparatus performs various ones of the operations outlined above with regard to the methods of the illustrative embodiments.

In another illustrative embodiment, a computer program product for automatic workflow composition in a stream processing system is provided. The computer program product comprises computer usable program code configured to perform various ones of the operations outlined above with regard to the method in the illustrative embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A-7D illustrate an example of a domain definition file in accordance with an exemplary embodiment;

FIG. 8 illustrates an example of a problem definition file in accordance with an exemplary embodiment;

FIGS. 9A and 9B illustrate an example of an output file in accordance with an exemplary embodiment.

DETAILED DESCRIPTION OF THE PREFERRED EMBODIMENT

Figure 1:
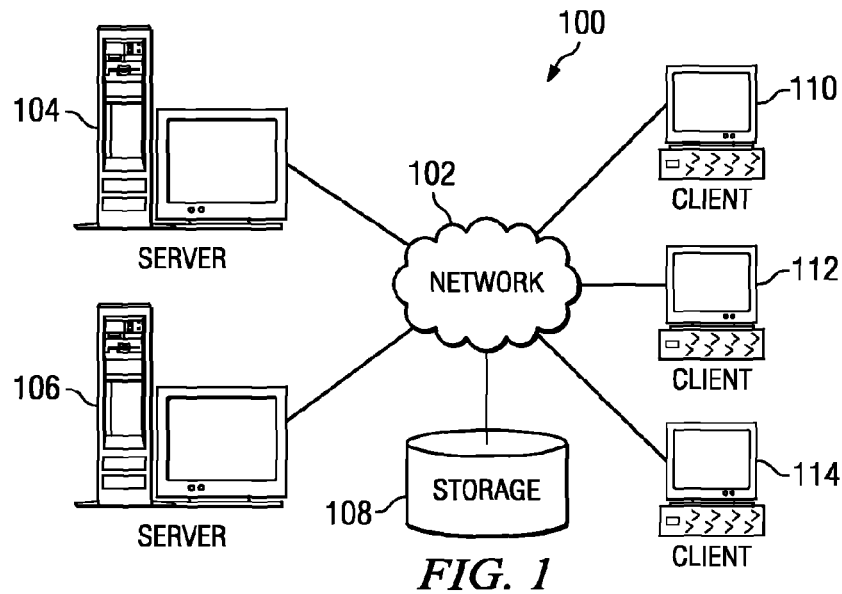
FIG. 1 is a pictorial representation of a network of data processing systems in which aspects of the present invention may be implemented.
Figure 2:
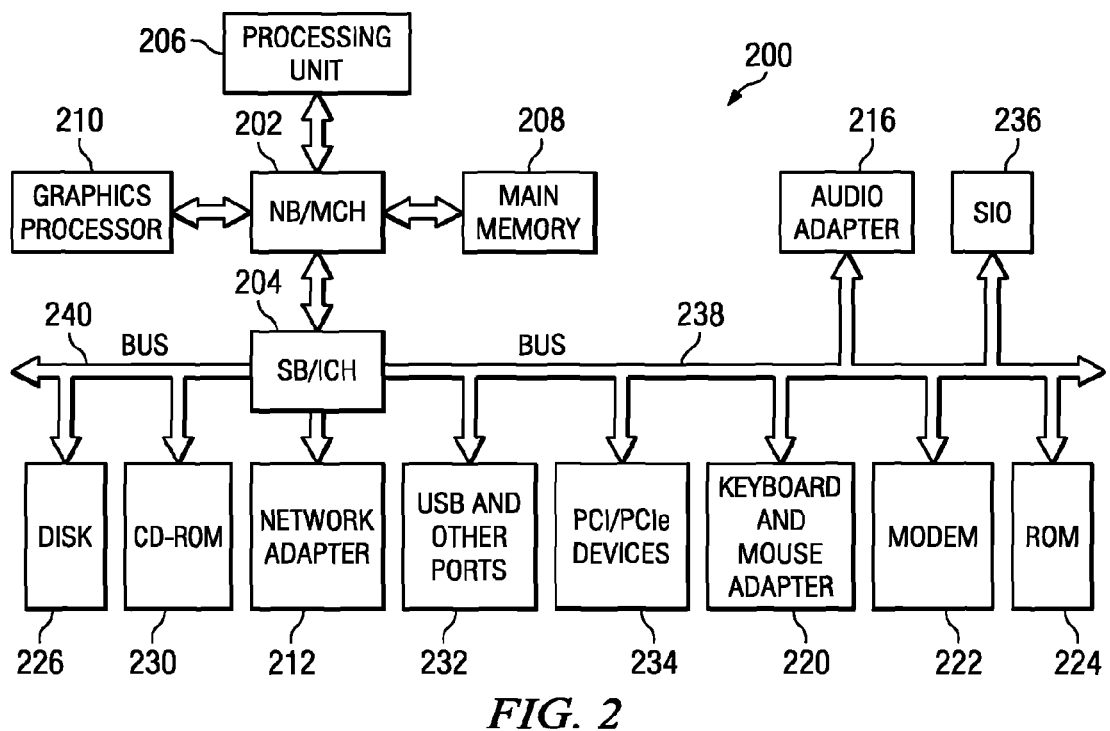
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In an exemplary embodiment, server 104 may provide stream processing applications to clients 110, 112, and 114. Clients 110, 112, and 114 are clients to server 104 in this example. Network data processing system 100 may include additional servers, clients, and other devices not shown.

In one exemplary embodiment, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

Local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (JAVA is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
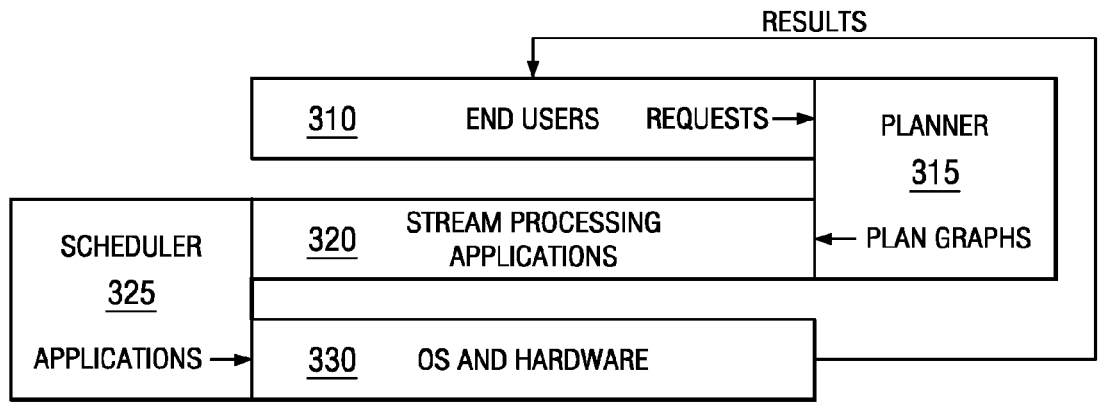
FIG. 3 illustrates an architecture for automatic composition of stream processing workflows satisfying output requirements expressed by end users in accordance with an exemplary embodiment of the present invention.

FIG. 3 illustrates an architecture for automatic composition of stream processing workflows satisfying output requirements expressed by end users in accordance with an exemplary embodiment of the present invention. To apply artificial intelligence automatic planning techniques, the system must describe the initial state, the goal state, the conditions for applying each of the possible actions to the states, and the effects of each action. This may be done using a predicate-based description language. The plan is defined as a sequence of actions that lead from the initial state to a state that satisfies all goal requirements.

Latest advances in artificial intelligence planning started with the application of plan graph analysis methods to planning. Application of plan graph analysis essentially increased the size of planning problems that can be solved by automatic planners. Further development of automated planning systems was stimulated by introduction of a standard for the description language for planning domains and planning problems. Planning is an important aspect of the autonomic computing model, and it has always been considered as part of the autonomic monitor-analyze-plan-execute using knowledge (MAPE-K) loop.

Recognition of the application of automatic planning to stream processing workflow composition is an important aspect of the present invention. Referring again to FIG. 3, end users 310 provide requests to planner 315. The requests are goal-based problems to be solved by planner 315, which then generates plan graphs to form stream processing applications 320. Scheduler 325 deploys and schedules stream processing applications 320 for execution within the operating system and hardware 330. Operating system and hardware 330 then returns the results to end users 310.

Figure 4:
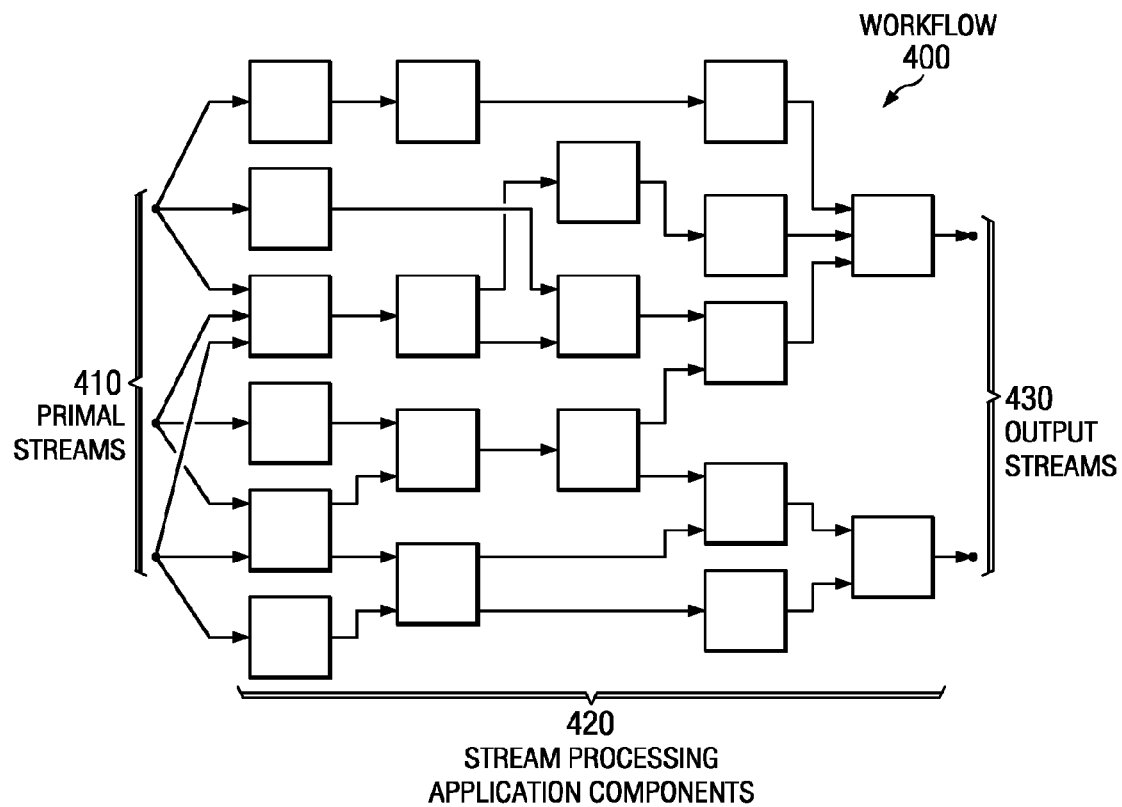
FIG. 4 illustrates an example of a stream processing workflow in accordance with exemplary aspects of the present invention.

FIG. 4 illustrates an example of a stream processing workflow in accordance with exemplary aspects of the present invention. Workflow 400 receives as input one or more primal streams 410. A stream represents a flow of information satisfying certain restrictions or constraints. Stream data could be characterized as a sequence of n-tuples of a predefined format. Primal streams 410 are streams that are received by the stream processing system, but are not generated within the stream processing system. Examples of primal streams include television audio and video information, audio information from a radio broadcast, stock quotes and trades, really simple syndication (RSS) feeds, and the like.

Stream processing application components 420 are configured to receive, analyze, and/or transform primal streams 410 to form resulting output streams 430. Application components 420 may be reusable components that perform stream processing functions, such as, for example, video processing, image analysis, speech-to-text conversion, text analytics, and the like. Each one of application components 420 may have one or more inputs and one or more outputs.

The number of possible primal streams within primal streams 410 is enormous. Since stream processing application components 420 are preferably reusable software components, they may be configured and reconfigured into many different workflows to form a seemingly limitless number of stream processing applications. Also, the workflows may become very complex. For example, a given workflow may use tens of primal streams and include hundreds, if not thousands, of application components. To generate such a workflow by hand, and on demand, would be quite challenging if not simply impracticable. In fact, it is even difficult to know all possible components and their parameters, much less to be able to combine them into an effective workflow that satisfies all of the user's requirements.

Figures 5, 6A, 6B, 6C, 6D, 6E, 6F:
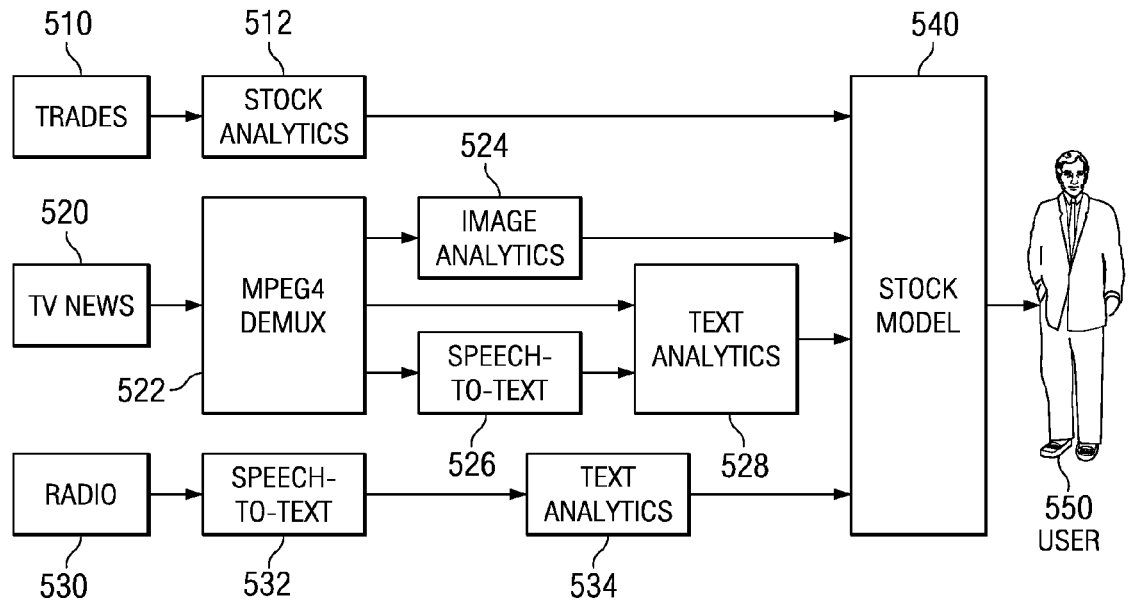
FIG. 5 illustrates an example of stream processing in accordance with exemplary aspects of the described embodiments.
FIGS. 6A-6F illustrate example stream processing planning data structures in accordance with an exemplary embodiment.

FIG. 5 illustrates an example of stream processing in accordance with exemplary aspects of the described embodiments. In this example, end user 550 requests to be notified when a particular stock is likely to exceed a predetermined value. Primal streams 510, 520, 530 include trades, television news, and radio broadcasts. In the depicted example, application components include stock analytics 512, moving pictures experts group 4 (MPEG-4) de-multiplexer 522, image analytics 524, speech-to-text conversion 526, text analytics 528, speech-to-text conversion 532, text analytics 534, and a stock model 540.

This stream processing application may be composed from existing application components, using available primal streams, such that the application components generate a result that satisfies the user's request. Thus, stock analytics component 512 receives trades information stream 510 and outputs results to stock model component 540.

MPEG-4 de-multiplexer component 522 receives a television news broadcast stream 520 and outputs to image analytics component 524, text analytics component 528, and speech-to-text conversion component 526. Speech-to-text conversion component 526, in turn, outputs to text analytics component 528. Image analytics component 524 and text analytics component 528 provide output to stock model component 540.

Speech-to-text conversion component 532 receives radio broadcast stream 530 and outputs to text analytics component 534. In turn, text analytics component 534 outputs to stock model 540. Stock model 540 provides output to user 550.

For stream processing workflow composition with automatic planning, the following formal definitions are provided:

1. A data structure for describing stream content. This data structure specifies values of predicates about certain properties of the stream, as well as certain properties and other types of descriptions. An example of a property is "video of type MPEG-4." A numeric property may be, for instance, "throughput=10 KB/s." This structure may be referred to as stream properties.
2. An instance of stream properties structures is created and initialized with appropriate values for each primal stream.
3. A formal description for each stream processing component. Each description includes:
   a. Definition of one or more input ports, where each input port defines the conditions under which a stream can be connected to the input port. In programming, a predicate is a statement that evaluates an expression and provides a true or false answer based on the condition of the data. These conditions are expressed as logical expressions in terms of stream properties. For example, a stream of type "video" may be required on one port of a stream processing component, and a stream of type "audio" on another.
   b. Definition of one or more output ports, where each output port definition describes a formula or a method for computing all properties of the output stream, possibly depending on the properties of all input streams connected to the component.
4. Each end user's request for stream processing (goal) is translated to a formal logical expression in terms of stream properties that must be satisfied by the property values associated with the output stream, or multiple output streams if multiple goal definitions are given.

Given the above problem definition, where metadata descriptions 1-3 are referred to as a "planning domain" and 4 is referred to as the "planning problem," the planning algorithm can compute properties of any stream produced by a component or a combination of components applied to primal streams, and verify whether goal requirements are satisfied. For example, the method of exhaustive search (depth-first or breadth-first) can be used to find a workflow that produces streams satisfying goal requirements. In some systems, it is important to find workflows that not only satisfy the goal, but also satisfy additional criteria, such as optimal quality or optimal resource usage. The same exhaustive search method, or more efficient methods, may be used to achieve these objectives.

In one embodiment, the formal description of the workflow composition problem defined above may be encoded using planning domain definition language (PDDL), and submitted to a planning system, such as LPG-td, Metric-FF, or any other known planning system. LPG (Local search for Planning Graphs) is a planner based on local search and planning graphs that handles PDDL2.1 domains involving numerical quantities and durations. The system can solve both plan generation and plan adaptation problems. LPG-td is an extension of LPG to handle the new features of the standard planning domain description languages PDDL2.2. Metric-FF is a domain independent planning system, which is an extension of the FF (Fast-Forward) planner to handle numerical state variables, more precisely to PDDL 2.1 level 2, yet more precisely to the subset of PDDL 2.1 level 2 with algorithmic principles.

In one embodiment, stream properties may be encoded as fluents and predicates parameterized with a stream object. Component descriptions are encoded as actions parameterized with input and output stream objects. Preconditions of actions consist of translated input port requirements on input streams and action effects compute the properties of output stream objects with the transformation formulas associated with output ports. A plan generated by the planning system as a sequence of actions is then translated into a workflow by identifying input-output port connections based on the sharing of stream objects between instantiated action parameters corresponding to the port.

However, trying to implement automatic planning for stream processing workflows using PDDL presents several difficulties. The fact that a given stream contains some predicates and that the number of streams is restricted only by equivalence relations dictates that a lot of space is required to describe all possible streams. An action of a component with multiple inputs and outputs cannot be effectively decomposed into a set of actions with conjunctive form of conditional effects. Again, to accurately represent stream processing components requires an enormous amount of space.

Table 1 summarizes results of experiments testing two known planners, LPG-td and Metric-FF.

TABLE 1

| Workflow size (p.u.) | Metric-FF | | | LPG-td | | |
|---|---|---|---|---|---|---|
| | min | avg | max | min | avg | max |
| 5 | 0.03 | 0.08 | 0.26 | 0.33 | 0.42 | 0.66 |
| 11 | 0.16 | 10.67 | 56.63 | 0.45 | 1.01 | 2.28 |
| 13 | 37.95 | * | * | 0.78 | # | # |
| 15 | 46.03 | * | * | 0.93 | 12.70 | 19.77 |
| 19 | 599.40 | * | * | 1.49 | 19.76 | 25.70 |
| 25 | * | * | * | 4.12 | 12.08 | 23.94 |
| 30 | * | * | * | 12.78 | 29.79 | 57.53 |
| 35 | * | * | * | 328.97 | * | * |
| 50 | # | # | # | # | # | # |

For each of the two planners, Table 1 shows recorded minimum, maximum, and average planning time (in seconds) on fifteen randomly generated instances of workflow composition problems for each of the fixed values of the number of processing units participating in the workflow. In this table, the "#" symbol indicates that the planner terminated abnormally, for example because of insufficient memory, and "*" indicates that the planner spent more than ten minutes to find a solution and was terminated.

Based on these results, one can conclude that for general-purpose planners, running time grows quickly with the size of the workflow. The composition problem constructed in the experiments was intentionally made very simple. The problem had a single unique solution and, theoretically, could be solved in time linear to workflow size. These results provide a lower bound on planner performance for real-world problems, since in practice the planner must analyze and choose from more than one candidate workflow. Similar performance problems are observed in experiments where the workflow size remains constant, but the total number of available processing units increases. These performance problems arise because the traditional planners are not designed to work with workflow composition problems.

Therefore, in one exemplary embodiment, an enhanced description language is provided. A stream processing planning language (SPPL) builds on the planning domain description language to address the special needs of stream processing workflow planning. Also, a simple method for automatic workflow composition based on the stream processing planning language is provided.

The stream processing planning language and automatic workflow composition method described herein results in improved performance. Table 2 presents results from experiments that compare the performance of this method to the performance of existing solvers.

TABLE 2

| Work-flow size (p.u.) | Stream | | | Metric-FF | | | LPG-td | | |
|---|---|---|---|---|---|---|---|---|---|
| | min | avg | max | min | avg | max | min | avg | max |
| 5 | 0.0 | 0.1 | 0.2 | 0.0 | 0.1 | 0.3 | 0.3 | 0.4 | 0.7 |
| 11 | 0.0 | 0.1 | 0.1 | 0.2 | 10.7 | 56.6 | 0.5 | 1.0 | 2.3 |
| 13 | 0.1 | 0.7 | 2.3 | 37.9 | * | * | 0.8 | # | # |
| 15 | 0.1 | 1.1 | 2.8 | 46.0 | * | * | 0.9 | 12.7 | 19.8 |
| 19 | 0.1 | 1.8 | 4.9 | * | * | * | 1.5 | 19.8 | 25.7 |
| 25 | 0.1 | 0.6 | 2.5 | 2.3 | * | * | 4.1 | 12.1 | 23.9 |
| 30 | 0.3 | 1.1 | 2.5 | * | * | * | 12.8 | 29.8 | 57.5 |
| 35 | 0.3 | 10.2 | 29.9 | * | * | * | 329.0 | * | * |
| 50 | 0.1 | 6.7 | 13.5 | # | # | # | # | # | # |
| 100 | 6.0 | 7.2 | 9.0 | # | # | # | # | # | # |
| 500 | 8.4 | 9.9 | 12.5 | # | # | # | # | # | # |

The improvement in performance observed is due to the utilization of planning domain structure that is specific to workflow planning. The "Stream" algorithm can quickly establish connections between the actions directly, without assigning intermediate stream variables. The general-purpose planners, in contrast, do not have the knowledge of workflow structure and must spend a considerable amount of time on evaluating different stream variable assignments. The workflow domain structure is made explicit to the solver by formulating the planning problem in stream processing planning language (SPPL), which is described in further detail below. A primary difference of SPPL from PDDL is in allowing actions to work with multiple inputs and multiple outputs.

The following features of PDDL are preserved in SPPL:
  single-input and single-output components can be used to model all PDDL concepts related to classical planning. These concepts include preconditions, add and remove lists of predicates, predicate parameters, conditional effects, etc.
  The same features can be used on each input and each output of an SPPL action, similarly to current usage on single input and single output of PDDL actions.
  SPPL actions can be parametric.
  The language can allow the definition of numerical functions, and corresponding numerical effects and preconditions for actions, as well as optimization and constraints on the value of these functions.
SPPL adds to PDDL the following unique features:
  At each planning stage, the state of the world consists of a set of available streams. Each stream is described by a set of stream fluents, or predicates. The sets of state variables are the same across all streams; however, the values can be different.
  Initial state of the world represents a set of primal streams available for processing. Each stream is described by its state, i.e. values assigned to state variables.
  Planning goal describes a set of streams, where for each stream constraints on state variables are specified.
  Once a stream is created, the predicates associated with the stream are never changed, and the stream is available to all subsequent actions as input.
  Multiple outputs are described by multiple effects produced simultaneously by an action. Each effect corresponds to creation of a new stream, and does not modify any of the existing streams.
  Multiple inputs are described by multiple preconditions required by the action. Each precondition expresses requirements on one input stream, which must be connected to the corresponding port.
  For convenience of expressing solutions, preconditions and effects may have names, which are also referred to as input and output names, respectively. After planning completion, the workflow (stream processing plan) is described by listing the action instances used in the workflow (one action may correspond to more than one instance) and links between effects and preconditions. The names are used in link descriptions to specify to which one of several effects and preconditions of action instance the link must be connected.

Within the scope of this disclosure, the goal is not to propose any specific syntax for the language, but rather to describe concepts and data structures used for describing workflow planning problems. This description does not include examples of using conditional effects, functions, or fluents. These extensions can be naturally added to the language, since it is very similar to PDDL, and syntax and semantics will be the same, with the exception that all effects are applied to merged streams.

Stream merging is an operation unique to SPPL. In PDDL, an effect describes modification to world state made by the action. Since an SPPL action may receive many states (states of all input streams connected to the action), if the effects were to be specified similarly to PDDL, the states of input streams must be merged to form a single state, to which the effect is applied following PDDL definition of action effects. The merging rules can differ.

In one exemplary implementation, three groups of state variables are defined: and-logic, or-logic, and clear-logic. For each of the groups, a unique merging rule is used. Predicates defined in and-logic rule are combined using a logical AND operation. For example, if and-logic predicate A is true in the state of input streams 1 and 1, but not in 3, the value of A in the merged state will be false. The or-logic predicates are combined using a logical OR operation. In the same situation as described above, the value of A would be true if A were an or-logic predicate. Clear-logic predicates always have a merged value of false.

FIGS. 6A-6F illustrate example stream processing planning data structures in accordance with an exemplary embodiment. More particularly, FIG. 6A illustrates an example data structure for a domain definition. The domain section is enclosed in a domain definition statement. The requirements, types, predicates, and actions are defined similarly to domain definition by specifying lists enclosed in parentheses. A domain definition alone does not constitute a planning problem. Both problem and domain definitions must be supplied to the solver in order to obtain a plan.

A requirements list is provided for backward compatibility only. FIG. 6B depicts an example data structure for a requirements list. Only one requirements section can be present in a domain definition. The requirements section describes file format and is optional.

A types section lists the names of the enumeration types used to define predicate parameters. Each predicate parameter must be a variable of one of the types defined here. The set of possible constant values of each type listed here must be defined in the objects section of the problem definition.

At most one types section can be present. If the propositional formulation is used, types section can be omitted. The planner may convert predicate formulations to propositional formulations during preprocessing. Therefore, propositional formulations are preferred to predicate formulations from an efficiency point of view, although both formulation types can be handled by the solver.

FIG. 6C depicts an example data structure for a types section of the domain definition. The list must start with :types declaration, and then the type names must follow. Below is an example:

```
(:types
    tag
    full_name
    age_group
)
```

A predicates section defines a group of predicates. Each group consists of an optional logic type specification and one or more predicate declarations. Each predicate declaration may also specify parameters for the predicates. For each parameter, the type must be specified.

All predicates within one group are assumed to follow the same input merging rules. The available choices are :andlogic, :orlogic, and :clearlogic. Only one of these merging operation types can be specified within one group. For backward compatibility with PDDL, if the merging operation is not specified, :andlogic is assumed.

Predicate group declaration must start with :predicates, followed by an optional merging operation identifier, and then by a list of predicate declarations. Each predicate declaration is a name of a predicate, possibly followed by parameters. Each parameter consists of a definition of a formal parameter starting with a question mark "?", and the type of the parameter separated from formal parameter by a dash "-".

Multiple groups can be defined within one domain. Defining more than one group with the same merging type is not prohibited. At least one group of predicates must be defined in each domain. The following is an example of a predicate group declaration:

```
(:predicates :andlogic
    (video_stream)
    (audio_stream)
    (contains ?t - tag)
    (filtered_by ?n - full_name ?a - age_group)
)
```

FIG. 6D illustrates an example data structure for action definition. An action definition describes a processing component and consists of one action name, one declaration of formal parameters, one resource cost vector, one or more preconditions, and one or more effects. Multiple action definitions are allowed in each domain. Each action must have a name, at least one precondition entry, and at least one effect entry.

An action singleton definition specifies that only a single action instance should be used in the workflow. This declaration is optional and is only included in the declaration of operators that should only be used once in the plan. Below is an example:

```
(:action SourceN1
    :singleton
    ...
)
```

Action parameters are defined in the same manner as in PDDL. An example of a data structure for parameters definition is as follows:
    :parameters (?t-type)

A cost vector definition is an additive resource cost vector corresponding to the action. A cost vector definition is an optional element. At most one cost vector definition is allowed. The costs are used for computing optimization objective and for specifying constraints. All cost vectors are added across all action instances in the workflow before the objective is computed or constraints are verified. An example of a cost vector definition is as follows:
    :cost (10 2 13.2)

A precondition definition for an action follows the same syntax as STRIPS PDDL, except that multiple preconditions corresponding to different input ports can be specified, and for each port the port name can be defined. Below is an example of a precondition definition for an action:
    :precondition [in1] (and (P0 ?t) (P1))

An effect definition for an action follows the same syntax as STRIPS PDDL, except that multiple effects corresponding to different output ports can be specified, and for each port, the port name can be defined. The following is an example of an effect definition:
    :effect [ou1] (and (P4 ?t) (not (P0 ?t)))

The following is an example of an action definition with parameters, cost vector, preconditions, and effects:

```
(:action A
    :parameters (?t - type)
    :cost (10 2 13.2)
    :precondition [in1] (and (P0 ?t) (P1))
    :precondition [in2] (and (P0 ?t) (P2))
    :effect [ou1] (and (P4 ?t) (not (P0 ?t)))
    :effect [ou2] (and (P5) (P4 ?t) (not (P0 ?t)))
)
```

FIG. 6E illustrates an example data structure for a problem definition. A problem definition consists of a problem name, a reference to the corresponding domain, the list of objects for each of the declared types, definitions of input streams and goals for output streams, resource constraints, and objective specification. A domain reference specifies the domain used in the problem definition. FIG. 6F illustrates an example data structure for a domain reference. The domain reference is a required element, exactly one domain reference must be specified. The referenced domain must be defined in the input to the solver; otherwise, the solver will fail.

Object definitions follow the same syntax as STRIPS PDDL object definitions. For each object, a type is defined. Following is an example of an objects definition:

```
(:objects
    com-ibm-distillery-sandp-labels - type_name
    com-ibm-distillery-VEHICLE - type_name
    com-ibm-distillery-BODYPART - type_name)
```

Input streams definitions follow the same syntax as STRIPS PDDL init (a list of ground predicates). However, unlike in PDDL, multiple inits can be specified, each corresponding to a separate input stream. Output streams (goals) definitions follow the same syntax as STRIPS PDDL goal (a list of ground predicates). However, unlike in PDDL, multiple goals can be specified, each corresponding to constraints on a separate output stream.

Resource constraints are specified with a double vector, establishing the component-wise upper bound on the sum of resource requirement vectors for all action instances used in the plan. The definition starts with a :bound keyword, followed by a list of double values for the vector. Only a single resource constraints entry is allowed. If the constraints are not specified, the one-dimensional vector will be used.

In PDDL, a similar statement can specify more general constraints on functions, such as $>$, $>=$, $<$, $<=$, $=$, comparing to another function, expression, or constant. An example is as follows:

(>=(function1)(function2))

An optimization objective may be specified by a double vector of coefficients. The object vector is multiplied by the sum of resource vectors of all action instances included in the workflow to compute the objective value for minimization. Only one objective can be specified. If no objective is given, then a constant one-dimensional vector (1) is used.

In PDDL, a similar statement can be used to specify an expression to use as an optimization metric expression using a (:metric) statement, such as (:metric minimize (function1)).

Below is an example of an optimization objective in SPPL:
(:objective 1.0 0 0)

The planning device, also referred to herein as the planner or solver, must find an optimal or close to optimal valid plan. Validity of a plan can be verified by forward predicate propagation procedure, which computes stream properties starting from primal streams used in the plan.

The computation of predicates starts with the source streams, for which all ground predicates that are true on the stream are listed in the corresponding (:init) statement. In general, the values of the predicates defined on the streams produced by components depend on the values of the predicates with the matching names and parameters defined on the streams connected to the input ports of the component. Since the planned workflow is a directed acyclic graph of component instances connected by streams, an automatic procedure can be used to compute the values of predicates on every stream, starting from the sources and reaching the goal, component by component, processing each component once all input stream predicates for the component are defined.

The planned workflow contains component instances, in which values for all parameters are given, and all predicates are ground. If the component is declared using :singleton declaration, at most one instance of the corresponding action can be used in a valid plan. In a valid workflow, the input streams connected to each component must satisfy the corresponding input port precondition: all predicates listed in the precondition must be true on the corresponding stream. The goal conditions, similarly, must be satisfied by the outgoing streams of the workflow.

The value of a ground predicate $p(x[1], x[2], \ldots, x[k])$ on an output stream is always true if the corresponding effect of the action instance contains the same ground predicate, and is always false if it contains the negation of this predicate, i.e. (not $p(x[1], x[2], \ldots, x[k])$). Otherwise, the value is determined as follows:

If predicate $p(\ )$ is declared in :clearlogic group, its value in the output stream will always be false, unless it is defined by the effect of an action instance as specified above.

If predicate $p(\ )$ is declared in :andlogic group, its value is equal to true if and only if the predicate with the same name and parameters is true on every input stream connected to the action instance, unless it is defined by the effect of an action instance as specified above.

If predicate $p(\ )$ is declared in :orlogic group, its value is equal to true if and only if the predicate with the same name and parameters is true on at least one input stream connected to the action instance, unless it is defined by the effect of an action instance as specified above.

The metrics of the plan are computed using a resource vector. The value of the resource cost vector for the workflow is equal to the sum of constant resource vectors specified for every action instance used in the workflow. If the same action corresponds to more than one instance in the workflow, the cost vector of the action is added to the total resource vector as many times as there are instances. For valid plans, the resulting total cost vector must not exceed (component-wise) the bound vector, if the bound vector is specified in a :bound statement.

If an (:objective) statement is used to specify the objective vector, c, then the plan constructed by the planner must achieve the minimum value of scalar product c'x, where x is the total cost vector of the plan, among all feasible plans. It is allowed for the planning device to produce suboptimal plans if they have close to optimal objective values.

Similar workflow composition problems arise in web services and grid computing. Grid computing is applying the resources of many computers in a network to a single problem at the same time. Existing standards, such as Ontology Web Language for Services (OWL-S) and Web Services Description Language (WSDL), provide methods and data structures for describing the functionality of web service components, referred to as services. Ontology is a hierarchical taxonomy of terms describing a certain area of knowledge. In the case of OWL-S, the ontology describes web services. The interaction between the components in web services may be more general than those in stream processing systems, and may take the form of a request and response instead of a cyclic information flow.

Exemplary aspects of the present invention apply to web services applications. In the case of web services applications, the descriptions of the web services are translated into SPPL representation. In this representation, each SPPL action represents a web service, the conditions for applying the actions describe conditions on the data received as input by the web service, and the effects of the actions describe the data produced by the services in response to the input. After planning, the workflow may be translated into a format that may be executed in a web services execution environment. A web services execution environment is an environment where web services applications are executed to perform an intended function.

FIGS. 7A-7D illustrate an example of a domain definition file in accordance with an exemplary embodiment. FIG. 8 illustrates an example of a problem definition file in accordance with an exemplary embodiment. FIGS. 9A and 9B illustrate an example of an output file in accordance with an exemplary embodiment.

Figure 10:
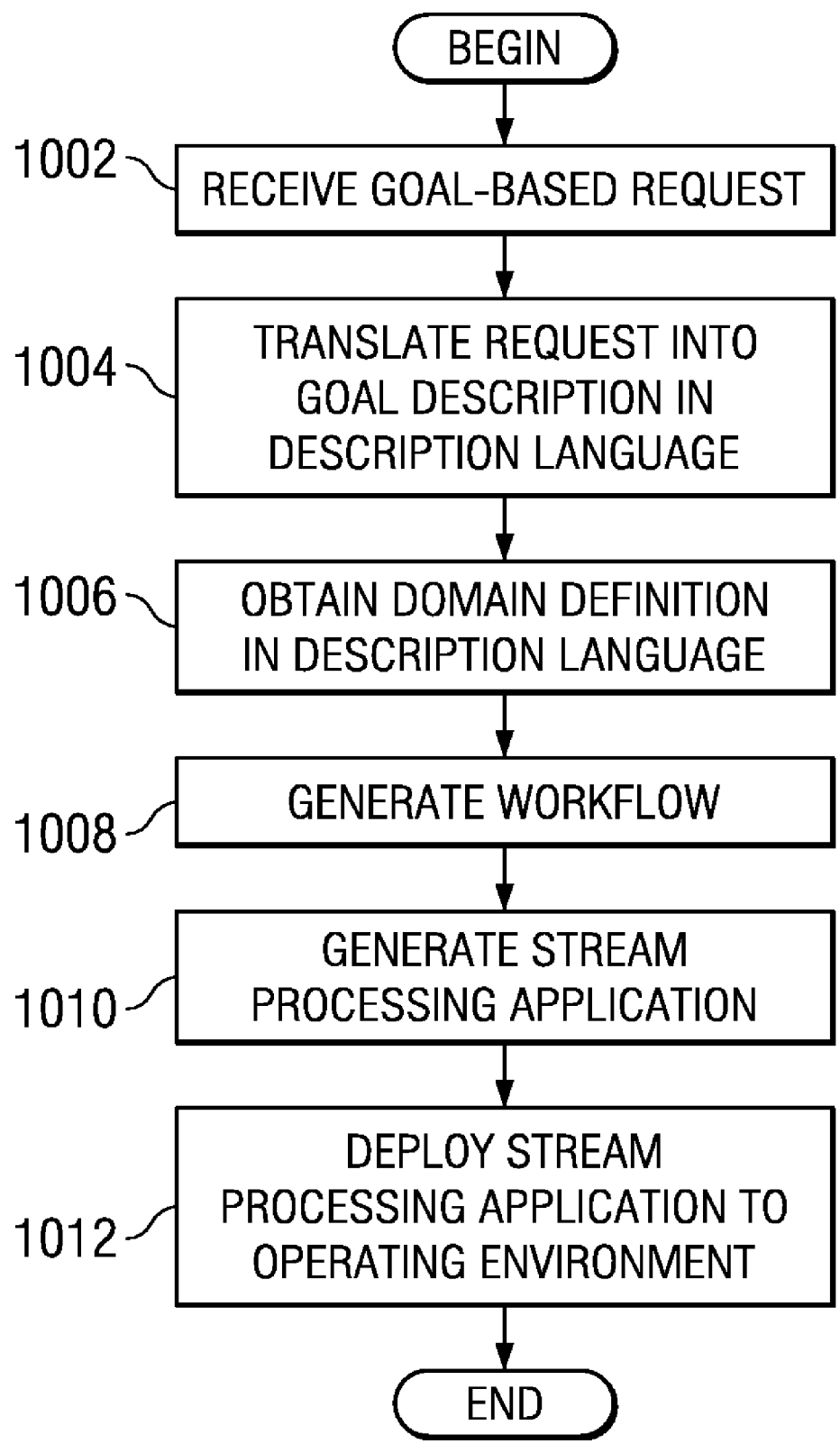
FIG. 10 is a flowchart illustrating the operation of a stream processing system in accordance with an exemplary embodiment.

FIG. 10 is a flowchart illustrating the operation of a stream processing system in accordance with an exemplary embodiment. It will be understood that each block of the flowchart illustration, and combinations of blocks in the flowchart illustration, can be implemented by computer program instructions.

These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also exist within a computer-readable memory, storage, or transmission medium that can direct a processor or other programmable data processing apparatus to function in a particular manner. Instructions stored in a computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and computer usable program code for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

With particular reference to FIG. 10, operation begins and the stream processing system receives a goal-based request (block 1002). The stream processing system translates the request into a goal description in the description language (block 1004). The planner obtains a domain definition in the description language (block 1006) and generates a workflow that satisfies the goal description given the domain definition (block 1008). Thereafter, the stream processing system generates a stream processing application (block 1010). The stream processing system deploys the stream processing application to the operating environment (block 1012), and operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatic workflow composition in a stream processing system, the computer implemented method comprising:
   providing a description language for stream processing workflow composition;
   providing a domain definition data structure in the description language, wherein the domain definition data structure defines all stream processing components available to the stream processing system;
   responsive to receiving a stream processing request, translating the stream processing request into a problem definition, wherein the problem definition defines stream properties that must be satisfied by property values associated with one or more output streams; and
   generating a workflow that satisfies the problem definition given the domain definition data structure, wherein each primal stream available to the stream processing system and each output stream generated by a stream processing component is represented by a set of predicates, wherein each predicate in the set of predicates is specified by a predicate declaration that includes at least one predicate parameter for the each predicate.

2. The computer implemented method of claim 1, wherein one or more stream properties data structures in the description language define primal streams available to the stream processing system and wherein each stream properties data structure is initialized with one or more property values for each primal stream.

3. The computer implemented method of claim 2, wherein the domain definition data structure comprises a plurality of stream processing component data structures in the description language, wherein each stream processing component data structure describes one or more input ports and one or more output ports.

4. The computer implemented method of claim 3, wherein a given stream processing component data structure within the plurality of stream processing component data structures defines a plurality of output ports.

5. The computer implemented method of claim 3, wherein each input port of each stream processing component is modeled using one or more preconditions on an action associated with the stream processing component.

6. The computer implemented method of claim 3, wherein each output port of each stream processing component data structure is modeled using effects of the action associated with the stream processing component.

7. The computer implemented method of claim 6, wherein a given stream processing component in the workflow receives a first primal stream at a first input port and wherein the one or more property values for the first primal stream satisfy the one or more preconditions of the first input port.

8. The computer implemented method of claim 6, wherein a first stream processing component in the workflow generates an output stream at a first output port and wherein a second stream processing component receives the output stream at a first input port, wherein the one or more property values for the output stream satisfy the one or more preconditions of the first input.

9. The computer implemented method of claim 6, wherein a given stream processing component in the workflow generates an output stream at a first output port and wherein the one or more property values for the output stream satisfy the problem definition.

10. The computer implemented method of claim 3, further comprising:
wherein a given stream processing component receives a web service description as an input; and
translating the web service description into the description language for stream processing workflow composition.

11. The computer implemented method of claim 10, further comprising:
translating the workflow into a format that may be executed in a web service execution environment.

12. The computer implemented method of claim 1, wherein the at least one predicate parameter comprises at least two predicate parameters and a formula associated with the at least two predicate parameters that is used for computing a given output stream.

13. The computer implemented method of claim 1, wherein the stream processing system is operable for processing at least one of video data and audio data.

14. The computer implemented method of claim 1, wherein the domain definition data structure comprises a plurality of stream processing component data structures in the description language, wherein at least one stream processing component data structure describes a plurality of input ports and a plurality of output ports.

15. A data processing apparatus for automatic workflow composition in a stream processing system, the data processing apparatus comprising a data processor and a memory, and further comprising:
a description language for stream processing workflow composition;
a domain definition data structure in the description language, wherein the domain definition data structure defines all stream processing components available to the stream processing system; and
a planner that translates a stream processing request into a problem definition, wherein the problem definition defines stream properties that must be satisfied by property values associated with one or more output streams, and generates a workflow that satisfies the problem definition given the domain definition data structure, wherein each primal stream available to the stream processing system and each output stream generated by a stream processing component is represented by a set of predicates, wherein each predicate in the set of predicates is specified by a predicate declaration that includes at least one predicate parameter for the each predicate.

16. The data processing apparatus of claim 15, wherein one or more stream properties data structures in the description language define primal streams available to the stream processing system and wherein each stream properties data structure is initialized with one or more property values for each primal stream.

17. The data processing apparatus of claim 16, wherein the domain definition data structure comprises a plurality of stream processing component data structures in the description language, wherein each stream processing component data structure describes one or more input ports and one or more output ports.

18. The data processing apparatus of claim 17, wherein a given stream processing component data structure within the plurality of stream processing component data structures defines a plurality of output ports.

19. The data processing apparatus of claim 17, wherein each input port of each stream processing component is modeled using one or more preconditions on an action associated with the stream processing component.

20. The data processing apparatus of claim 17, wherein each output port of each stream processing component data structure is modeled using effects of the action associated with the stream processing component.

21. The data processing apparatus of claim 20, wherein a given stream processing component in the workflow receives a first primal stream at a first input port and wherein the one or more property values for the first primal stream satisfy the one or more preconditions of the first input port.

22. The data processing apparatus of claim 20, wherein a first stream processing component in the workflow generates an output stream at a first output port and wherein a second stream processing component receives the output stream at a first input port, wherein the one or more property values for the output stream satisfy the one or more preconditions of the first input.

23. The data processing apparatus of claim 20, wherein a given stream processing component in the workflow generates an output stream at a first output port, wherein the one or more property values for the output stream satisfy the problem definition.

24. A computer program product for automatic workflow composition in a stream processing system, the computer program product comprising:
a computer readable storage medium having computer usable program code stored therein;
a description language for stream processing workflow composition;
computer usable program code configured to provide a domain definition data structure in the description language, wherein the domain definition data structure defines all stream processing components available to the stream processing system;
computer usable program code configured to translate a stream processing request into a problem definition, wherein the problem definition defines stream properties that must be satisfied by property values associated with one or more output streams; and computer usable program code configured to generate a workflow that satisfies the problem definition given the domain definition data structure, wherein each primal stream available to the stream processing system and each output stream generated by a stream processing component is represented by a set of predicates, wherein each predicate in the set of predicates is specified by a predicate declaration that includes at least one predicate parameter for the each predicate.

* * * * *